US010824826B2

(12) United States Patent
Guess et al.

(10) Patent No.: US 10,824,826 B2
(45) Date of Patent: Nov. 3, 2020

(54) UTILIZATION OF IMAGING BAR-CODE SCANNERS FOR DETECTING ANOMALIES WITH USER SCANNING METHODS

(71) Applicant: Datalogic USA, Inc., Eugene, OR (US)

(72) Inventors: Alan Guess, Veneta, OR (US); Moses Tam, Eugene, OR (US)

(73) Assignee: Datalogic USA, Inc., Eugene, OR (US)

( * ) Notice: Subject to any disclaimer, the term of this patent is extended or adjusted under 35 U.S.C. 154(b) by 0 days.

(21) Appl. No.: 16/232,233

(22) Filed: Dec. 26, 2018

(65) Prior Publication Data

US 2020/0210652 A1 Jul. 2, 2020

(51) Int. Cl.
| | |
|---|---|
| *H02P 1/00* | (2006.01) |
| *G06K 7/10* | (2006.01) |
| *G06F 9/54* | (2006.01) |
| *G06K 7/14* | (2006.01) |
| *G06Q 20/20* | (2012.01) |

(52) U.S. Cl.
CPC ......... *G06K 7/10128* (2013.01); *G06F 9/542* (2013.01); *G06K 7/10861* (2013.01); *G06K 7/1473* (2013.01); *G06Q 20/20* (2013.01)

(58) Field of Classification Search
CPC ........... G06K 2207/1012; G06K 20/20; G07G 1/0036
USPC ................ 235/462.31, 462.14, 378, 383
See application file for complete search history.

(56) References Cited

U.S. PATENT DOCUMENTS

| | | | |
|---|---|---|---|
| 5,280,162 A | 1/1994 | Marvin | |
| 5,449,891 A | 9/1995 | Siebel | |
| 5,637,854 A | 6/1997 | Thomas | |
| 5,747,784 A | 5/1998 | Walter et al. | |
| 5,883,968 A * | 3/1999 | Welch | A47F 9/045 382/100 |
| 6,236,736 B1 | 5/2001 | Crabtree et al. | |
| 6,427,915 B1 | 8/2002 | Wike, Jr. et al. | |
| 7,132,947 B2 | 11/2006 | Clifford et al. | |
| 7,170,414 B2 | 1/2007 | Clifford et al. | |
| 7,495,564 B2 | 2/2009 | Harold et al. | |
| 7,527,198 B2 | 5/2009 | Salim et al. | |

(Continued)

FOREIGN PATENT DOCUMENTS

| | | |
|---|---|---|
| EP | 3 291 544 A1 | 3/2018 |
| EP | 3 416 089 A1 | 12/2018 |
| WO | 2018097926 A1 | 5/2018 |

OTHER PUBLICATIONS

International Search Report and Written Opinion received for PCT Patent Application No. PCT1US20191064660, dated Jun. 19, 2020, 12 pages.

*Primary Examiner* — Daniel St Cyr
(74) *Attorney, Agent, or Firm* — Shook, Hardy & Bacon L.L.P.

(57) ABSTRACT

Systems and methods are provided for detecting anomalies, for instance, user-caused scanning anomalies, which occur during scanning transactions. Scanning-related events may be detected by a scanning device and notifications of such events may be transmitted from the scanning device to a point-of-sale (POS) host device coupled therewith. In aspects, the notifications transmitted to the POS host device include a unique code (e.g., a barcode or label) that is indicative of the corresponding event. Responsive to receipt of the event notifications and the nature thereof, the POS host device may initiate one or more anomaly detection actions.

18 Claims, 6 Drawing Sheets

(56) References Cited

U.S. PATENT DOCUMENTS

| | | |
|---|---|---|
| 7,527,207 B2 | 5/2009 | Acosta et al. |
| 8,006,904 B2 | 8/2011 | Salim et al. |
| 8,448,859 B2 | 5/2013 | Goncalves et al. |
| 2003/0078849 A1 | 4/2003 | Snyder |
| 2005/0008261 A1 | 1/2005 | Wolf et al. |
| 2005/0189412 A1* | 9/2005 | Hudnut ............... G07G 3/003 235/383 |
| 2006/0180670 A1 | 8/2006 | Acosta et al. |
| 2008/0078839 A1 | 4/2008 | Barkan |
| 2016/0125367 A1* | 5/2016 | Bowles ............... G06Q 10/30 705/14.11 |
| 2018/0151042 A1 | 5/2018 | Pang et al. |

* cited by examiner

UTILIZATION OF IMAGING BAR-CODE SCANNERS FOR DETECTING ANOMALIES WITH USER SCANNING METHODS

BACKGROUND

Various types of data readers for reading and decoding barcodes and other optical codes and symbols are known to those having ordinary skill in the art. Such data readers may be hand held (such as wands) or may be integrated within, for instance, a counter and/or mounted substantially perpendicularly thereto. Such mounted or integrated scanning devices may include presentation scanning devices designed to read an optical code of an item held relatively stationary in the scan volume and/or sweep scanning devices which may rely, at least in part, on movement of an optical code through the scan volume.

Optical code scanning devices of the mounted or integrated type are often utilized in retail environments, for instance, supermarkets and the like. In recent years, to cut down on personnel expense and take advantage of the ease-of-scan capabilities afforded by modern optical code scanning devices and complementary automatic payment technologies, such scanning devices have been incorporated into self-checkout environments. When incorporating an optical code scanning device into a self-checkout environment however, a number of issues may arise. For instance, many users are not familiar with the proper method for presenting an item to the scanning device for scanning and decoding. To that end, attempts at scanning the item by presenting the item to or moving the item through the scan volume may not result in an optical code being read and transmitted to the point-of-sale host device due, for instance, to bad item orientation, an occulted optical code, or the like, thus resulting in a "no read" scanning transaction. In other instances, a "no read" scanning transaction may be an attempt to defraud the store by a user attempting to make it appear as though an item was scanned, decoded and transmitted to the point-of-sale host device when in fact it was not.

To aid in monitoring scanning operations and reduce the number of scanning transactions resulting in an optical code not being read (i.e., decoded), some retail environments utilize cameras external to the scanning system (e.g., an overhead or side-mounted camera). While useful in some circumstances, this solution still requires human monitoring of the captured images to determine if anything out of the ordinary has taken place.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In various embodiments, systems and methods are provided for detecting anomalies, for instance, user-caused scanning anomalies, which occur during scanning transactions. Scanning-related events (e.g., item-entry events, item identifier scan events and item-exit events) are detected by a scanning device and notifications of such events are transmitted from the scanning device to a point-of-sale (POS) host device coupled therewith. In aspects, the notifications transmitted to the POS host device include a code (e.g., a barcode or label) that is indicative of the corresponding event. Responsive to receipt of the event notifications and the nature thereof, the POS host device initiates one or more anomaly detection actions (e.g., generating scanning-device-enable commands, generating scanning-device-disable commands, initiating video recording, ceasing video recording, generating a scanning anomaly notification, storing a record indicating that a scanned-item-identifier event notification was not received, and initiating a fraud analysis).

Embodiments hereof allow the imaging subsystem (e.g., camera) of the optical code scanning device to assist, with minimal human interaction, when these anomalous situations occur. Embodiments hereof further permit a POS host device to control, in real-time and responsive to received event notifications, actions taken by a scanning device. This, in turn, aids in detection of unintentional scanning anomalies as well of user fraud that may occur during scanning transactions.

BRIEF DESCRIPTION OF THE DRAWINGS

The present disclosure is illustrated by way of example and not limitation in the accompanying figures in which like reference numerals indicate similar elements and in which.

DETAILED DESCRIPTION

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Optical codes typically comprise a pattern of dark elements and light spaces. There are various types of optical codes including one-dimensional codes (such as UPC and EAN/JAN barcodes) and two-dimensional codes (such as PDF-417 and Maxicode). For convenience, some embodiments are described herein with reference to one-dimensional barcodes. However, the embodiments also may be useful for other optical codes and symbols, and nothing herein should be construed as limiting the embodiments to barcodes. Other methods of identifying products including watermarks or other observable indicia (e.g., packaging designs, text, etc.) also are contemplated as being used alone, or in combination with optical codes, when identifying an item within a scan volume of a scanning device. It is noted that the terms "item" and "product" may be used interchangeably herein.

As previously set forth, mounted or integrated optical code scanning devices often are utilized in retail environments. To cut down on personnel expense and take advantage of the ease-of-scan capabilities afforded by modern optical code scanning devices and complementary automatic payment technologies, scanning devices have been incorporated into self-checkout environments. While helpful in many regards, such incorporation also may result in a number of unintended consequences. For instance, many users are not familiar with the proper method for presenting an item to a scanning device for scanning and decoding. Thus, user attempts at scanning an item by presenting it to or moving it through the scan volume may not result in an optical code being read and transmitted to the point-of-sale host device due, for instance, to bad item orientation, an occulted optical code, etc., thus resulting in a "no read" scanning transaction. In other instances, a "no read" scanning transaction may be an attempt to defraud the retailer by a user attempting to make it appear as though an item was scanned, decoded and transmitted to the point-of-sale host device when in fact it was not.

To aid in monitoring scanning operations and reduce the number of scanning transactions resulting in an optical code not being read, various aspects of the technology described herein are generally directed to detecting scanning anomalies, for instance, anomalies caused by users during a scanning transaction. In embodiments, such user-caused anomalies may include incorrect item orientation, occulted optical codes, failure to scan an optical code, or scanning of an incorrect optical code, whether such anomalies are unintentionally or deliberately caused. A first event may be detected by a scanning device. In embodiments, the first event may comprise an item-entry event triggered when an item enters the scan volume of the scanning device. In embodiments, such item-entry event may be detected responsive to a camera of the scanning device detecting that an item has entered its field-of-view. A notification of the first event (e.g., an item-entry event notification) then may be generated by the scanning device and transmitted to a point-of-sale (POS) host device coupled therewith. In embodiments, the first event notification may include a unique code that is indicative of the corresponding event, for instance, a code indicative of the item-entry event. The POS host device may receive the first event notification and, in response thereto, initiate one or more anomaly detection actions. In embodiments, such anomaly detection actions may include video recording of the scanning transaction, for instance, utilizing the camera of the scanning device.

A second event may be detected by the scanning device. In embodiments, the second event may be an item-identifier-scan event triggered by the scanning device scanning and decoding an optical code coupled with the item. In embodiments, the second event may be an item-exit event triggered when the item exits the scan volume of the scanning device. In embodiments, such item-exit event may be detected responsive to the camera of the scanning device detecting that an item has exited its field-of-view. In either case, a notification of the second event may be generated by the scanning device and transmitted to the POS host device. In embodiments, the second event notification may include a unique code that is indicative of the corresponding event, for instance, a code indicative of the item-identifier-scan event or a code indicative of the item-exit event.

When the second event is an item identifier scan event, the scanning device may transmit the item identifier scan event notification to the POS host device. In response to receipt of such item identifier scan event notification, the POS host device may initiate a second anomaly-detection action. In embodiments, the second anomaly-detection action may include ceasing of video recording of the scanning transaction.

When the second event is an item-exit event, the scanning device may transmit an item-exit event notification to the POS host device and, in response thereto, the POS host device may initiate a second anomaly-detection action. In embodiments, the second anomaly-detection action may include one or more of generating a scanning-device-disable command, generating a scanning-anomaly notification, storing a record indicating a scanned-item-identifier event notification was not received (such record including or not including a video recording of the scanning transaction), and initiating a fraud analysis.

Accordingly, exemplary embodiments are directed to methods, performed by a point-of-sale host device, for detecting scanning anomalies. Such methods may include receiving, from a scanning device, a first event notification, the first event notification being an item-entry event notification. Such methods further may include initiating one or more first anomaly-detection actions responsive to the received first event notification and receiving, from the scanning device, a second event notification, the second event notification being one of a scanned-item-identifier event notification or an item-exit event notification. Still further, such methods may include initiating one or more second anomaly-detection actions responsive to the second event notification. In embodiments, at least one of the first event notification and the second event notification includes a unique code that is indicative of the corresponding event.

Other exemplary embodiments are directed to systems for detecting scanning anomalies. Such systems may include a scanning device and a point-of-sale host device. The scanning device may be configured to detect events, including item-entry events, item-identifier-scan events and item-exit events. The scanning device further may be configured to transmit notifications of detected events to the point-of-sale host device. The point-of-sale host device may be configured to receive event notifications from the scanning device, including item-entry event notifications, scanned-item-identifier event notifications and item-exit event notifications. The point-of-sale host device further may be configured to initiate anomaly detection actions responsive to received event notifications. In embodiments, at least one of the item-entry event notification, the scanned-item-identifier event notification and the item-exit event notification includes a unique code that is indicative of the corresponding event.

Still other exemplary embodiments are directed to methods for detecting scanning anomalies. Such methods may include capturing image data from a camera of the scanning device; detecting entry of an item into a scan volume of the camera responsive to analyzing the image data; and transmitting an item-entry event notification including a first event code from the scanning device to a point-of-sale (POS) host device. Such methods further may include transmitting an item code to the POS host device if the item is identified from observable indicia associated with the item while analyzing the image data; detecting exit of the item from the scan volume of the camera responsive to analyzing the image data; and transmitting an item-exit event notification including a second event code from the scanning device to the POS host device.

Figure 1:
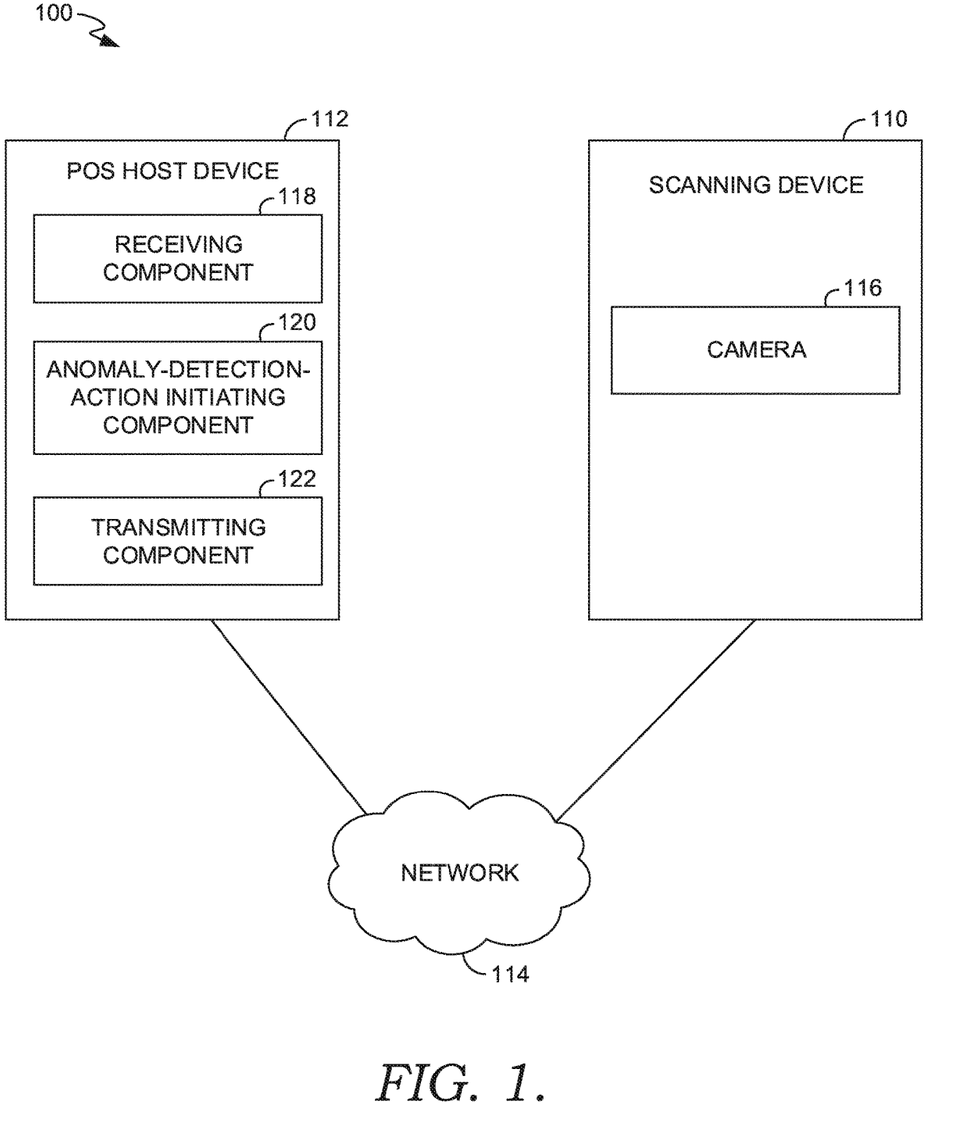
FIG. 1 is a schematic diagram of an exemplary system for detecting scanning anomalies, in accordance with embodiments of the present disclosure.

Turning now to FIG. 1, illustrated is a simplified block diagram showing an exemplary system 100 for detecting anomalies, for instance, user-caused anomalies, in scanning transactions. Such a system 100 may be incorporated in a retail environment, such as a self-checkout station, an assisted checkout station, an automated checkout station, or similar environments. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory. Each of the components shown in FIG. 1 can be provided on one or more computing devices. It should be noted that implementations of the present disclosure are equally applicable to mobile computing devices and devices accepting gesture, touch and/or voice input. Any and all such variations, and any combination thereof, are contemplated to be within the scope of implementations of the present disclosure.

The system 100 is an example of a suitable architecture for implementing certain aspects of the present disclosure. Among other components not shown, in the illustrated aspect, the system 100 comprises a scanning device 110 and a POS host device 112 in communication with one another through a network 114. It should be understood that any number of POS host devices and/or scanning devices may be employed within the system 100 within the scope of implementations of the present disclosure. Each may comprise a single device or multiple devices cooperating in a distributed environment. For instance, the POS host device 112 could be provided by multiple devices collectively providing the functionality of the POS host device 112 as described herein. Additionally, other components not shown also may be included within the network environment.

The network 114 may be any type of communication scheme that allows devices to exchange data. For example, the network 114 may include fiber optic, wired and/or wireless communication capability in any of a plurality of protocols, such as TCP/IP, Ethernet, WAP, IEEE 802.11, or any other protocols. Implementations are contemplated in which the system 100 may be accessible through a shared public infrastructure (e.g., the Internet), an extranet, an intranet, a virtual private network (VPN), a local area network (LAN), a wide area network (WAN), a peer-to-peer (P2P) network, a wireless communications network, a telephone network, a facsimile network, a cloud network, or any combination thereof. Such networks are commonplace in today's computing environments and, accordingly, are not further described herein. Although many of the components illustrated in FIG. 1 are described as individual components or functional entities, in some cases, they may be implemented as discrete or distributed components, or in conjunction with other components, having any suitable location or combination.

The scanning device 110 includes a camera 116 that, in cooperation with a processor and other communication elements (not shown), is configured to detect events related to scanning operations. Such events may include, by way of example only, item-entry events, item-identifier-scan events and item-exit events. Thus, the camera 116 of the scanning device 110 may be configured to capture (i.e., scan) the observable indicia (e.g., barcode, label, watermark, packaging, etc.) used to identify an item (i.e., a product) entering into a scanning operation, and also configured to detect the entry and exit of the item with respect to the scan volume. As the camera 116 within the scanning device 110 may be used to capture the observable indicia associated with the item as well as entry and exit of the item with respect to the scan volume, external cameras may not be needed in some embodiments of the disclosure.

In embodiments, an item-entry event may be triggered when the item enters the scan volume of the scanning device 110. Such item-entry event may be detected responsive to the camera 116 of the scanning device 110 detecting that an item has entered its field-of-view by analyzing the histogram of pixel intensities from the captured image. In embodiments, an item identifier scan event may be triggered by the scanning device 110 scanning and/or decoding an optical code coupled with the item. In embodiments, the second event may be an item-exit event triggered when the item exits the scan volume of the scanning device 110. In embodiments, such item-exit event may be detected responsive to the camera 116 of the scanning device 110 detecting that an item has exited its field-of-view.

The scanning device 110 further is configured to generate event notifications and transmit such notifications to the POS host device 112 (e.g., via the network 114). Such event notifications may include, by way of example only, item-entry event notifications (designed to notify the POS host device 112 that an item has entered the scan volume of the scanning device 110), item-identifier-scan event notifications (designed to notify the POS host device 112 that an optical code coupled with an item has been scanned and/or decoded), or item-exit event notifications (designed to notify the POS host device 112 that an item has exited the scan volume of the scanning device 110). In embodiments, event notifications transmitted by the scanning device 110 include a unique code that is indicative of the corresponding event. Exemplary codes may indicate an item has entered the scan volume of the scanning device 110, an optical code coupled with an item has been scanned by the scanning device 110, an item has exited the scan volume of the scanning device 110 without an optical code coupled with the item being read, or an item has exited the scan volume of the scanning device 110 subsequent to an optical code coupled with the item being read. In embodiments, such codes take the same form as the optical codes readable by the scanning device 110. For instance, an event notification generated by a barcode scanning device may include a unique code having the same format as a Universal Product Code (UPC), Global Trade Item Number GTIN), European Article Number (EAN), Japan Article Number (JAN), or other similar codes typically assigned to unique products. As a result, the scanning device 110 may communicate the event notification to the POS host device 112 over the same interface as it does the item codes. As a result, the scanning device 110 may seamlessly integrate with various POS interface types if the POS host device 112 is configured to interpret and act responsive to the unique event code.

In this instance, the unique code returned by the scanning device 110 may be specifically designed to be indicative of the event for which the notification is generated as opposed to a particular item. For example, the scanning device 110 may generate a first unique code that corresponds to the item-entry event. The POS host device 112 may resolve the matching of the unique code in a similar manner as with product matching.

Still further, the scanning device 110 is configured to receive commands (e.g., commands transmitted to the scanning device 110 from the POS host device 112) and to act on those commands. In embodiments, such commands may include commands for anomaly-detection actions such as, by way of example only, a scanning-device-enable command, a scanning-device-disable command, a command for commencement of video recording, a command for cessation of video recording, a command for generation of a scanning-anomaly notification, a command for storage of a record indicating that a scanned-item-identifier event notification was not received, and a command for commencement of a fraud analysis.

The POS host device 112 includes a receiving component 118, an anomaly-detection-action initiating component 120 and a transmitting component 122. The receiving component 118 is configured to receive event notifications from the scanning device 110. In response to receiving such event notifications, the anomaly-detection-action initiating component 120 is configured to initiate anomaly-detection actions such as, by way of example only, enabling the scanning device 110, disabling the scanning device 110, commencing video recording, ceasing video recording, generating a scanning-anomaly notification, storing a record indicating that a scanned-item-identifier event notification was not received, and commencing a fraud analysis. In embodiments, anomaly-detection actions are initiated by the transmission of a command to initiate such action to the scanning device 110. Thus, the transmitting component 122 is configured to transmit commands, e.g., anomaly-detection-action initiating commands, to the scanning device 110.

Various operation scenarios are contemplated according to embodiments of the disclosure. In a "read" scenario, the item may be successfully scanned during the time in which the item is detected to be within the scan volume. As an example, the scanning device 110 may receive an enable command from POS host device 112. As a result, the scanning device 110 may enable its decoding functionality. Otherwise, if no enable command has been received, the scanning device 110 may remain in a wait state in which the scanning device 110 is effectively disabled such that decoding may not occur even if an item were to enter the scan volume. The enable command may be received responsive to power up of the POS host device 112 or another event, such as a manual user input to begin a scanning session. For example, the enable command may be initiated responsive to the user of a self-checkout station interacting with the touch screen interface or keypad to begin a scanning session. In some embodiments, the enable command may be initiated responsive to various events during a scanning session such as if a user pauses and then later resumes scanning or if a new enable command is transmitted after each item is successfully processed by the POS host device 112. Nevertheless, with the scanning device 110 enabled, the decoding functionality of the scanning device 110 may be operable.

As the user moves the item into the scan volume, the camera 116 of the scanning device 110 may detect entry of the item and transmit the entry code to the POS host device 112. The POS host device 112 may receive the entry code and resolve the code according to the corresponding instructions associated with the entry code, such as by recognizing the entry code in the code database as an activity code as opposed to an item code. The unique entry code may be associated with instructions for the POS host device 112 to take certain actions, such as initiating a video recording of the scan volume or other area proximate the POS host device 112. The scanning device 110 then may detect and decode the label to determine the corresponding item code for transmission to the POS host device 112. The POS host device 112 may receive the item code from the scanning device 110 and resolve accordingly, such as recognizing a product code as an item code as opposed to an activity code. The unique item code may be associated with a particular price or other information related to the item to enter the item into the transaction register.

The scanning device 110 may detect the item exiting the scan volume with its camera 116 and transmit an exit code to the POS host device 112. The POS host device 112 may receive the exit code and resolve the code according to the corresponding instructions associated with the exit code, such as by recognizing the exit code in the code database as an activity code as opposed to an item code. The unique exit code may be associated with instructions for the POS host device 112 to take certain actions, such as ceasing the video recording of the scan volume or other area proximate the POS host device 112. In some embodiments, information about the transaction may be stored for record keeping or analysis. In some embodiments, however, because the item was correctly identified before exiting the scan volume, the POS host device 112 may not store as much information from that action (if any) including discarding any video recording so as to save storage space for situations in which a problem is identified.

The POS host device 112 also may transmit a disable command to the scanning device 110. In some embodiments, the disable command may be transmitted responsive to receiving an exit code whereupon the scanning device 110 may enter its wait state (e.g., decoding functionality may be disabled) until another enable command is received from the POS host device 112. In some embodiments the scanning device 110 may automatically enter the wait state responsive to item decoding and/or detecting the item exiting the scan volume.

In a "no read" scenario, the item may not be successfully identified during the time in which the item is detected to be within the scan volume. As an example, the scanning device 110 may detect entry of the item into the scan volume and transmit the entry notification to the POS host device 112 as described above. During its time in the scan volume, the item may not have been identified before exit of the item is detected. For example, the barcode may have been covered by the user, the barcode may have been directed away from the camera 116, the item may have moved too quickly through the scan volume, the barcode may have been damaged or otherwise be unreadable by the scanning device 110, among other reasons. In any case, the scanning device 110 may detect exit of the item from the scan volume and transmit an exit code to the POS host device 112. The POS host device 112 may control one or more actions responsive to the exit code, such as stopping video recording, storing video of the actions taken while the item was in the scan volume for further analysis, recording a time entry of the detected "no read" situation, etc.

In some embodiments, the exit code transmitted to the POS host device 112 may be the same code regardless of whether or not the item was first identified by the scanning device 110. In such a situation, the POS device 112 may be configured to recognize that an entry code and an exit code were received from the scanning device 110 without any intervening item code being received. Thus, the POS host device 112 may be configured to initiate different actions in controlling the scanning device or performing other actions depending on the order of event notifications and/or item codes received from the scanning device 110. In some embodiments, the exit code transmitted to the POS host device 112 may be a different code depending on whether or not the item was first identified by the scanning device while in the scan volume. For example, a first exit code may be transmitted when the item was identified and a second exit code (different from the first exit code) may be transmitted when the item was not identified prior. Thus, the scanning device 110 may be configured to track the order of certain events and operations which may simplify the processes of the POS host device 112 to merely take actions specifically assigned to the received event code. In some embodiments, at least some of the tracking of event and/or code order may be performed by each of the POS host device 112 and the scanning device 110.

In a "no item seen" scenario, the scanning device 110 may be enabled for a predetermined period of time without any item being detected as entering or exiting the scan volume. In such a situation, the scanning device 110 may transmit a no-item-seen event notification including a unique code for this event that is different than an entry code, an exit code, etc. The no-item-seen code may of the same code format (e.g., GTIN) for the POS host device 112 to perform the associated tasks, such as disabling the scanning device, displaying a message on the display screen for the user to initiate a new scanning session, or other related actions. The scanning device 110 may remain in the wait state with the decoding functionality disabled until a new enable command is received, such as responsive to the user entering an input into the POS host device 112 to continue a transaction, start a new transaction, etc.

In some embodiments, multiple items may enter the scan volume and remain within the scan volume at one time before exiting. In some embodiments, the scanning device 110 may be configured to keep track of each item individually as to whether the item was successfully scanned or not read. In some embodiments, the scanning device 110 may transmit a new entry notification code each time a new item enters the scan volume regardless of whether the other items have exited. In some embodiments each entry code may be a new instance of the same entry code. Similarly, multiple instances of the same exit code may be transmitted each time an item exits the scan volume. In some embodiments, the scanning device may transmit different entry and exit codes so that the POS host device 112 may be configured to distinguish between items entering and exiting the scan volume. In such an embodiment, the scanning device 110 may be configured to also transmit additional information with the item code indicative of which of the items currently in the scan volume corresponds to that particular successful scan.

Figure 2:
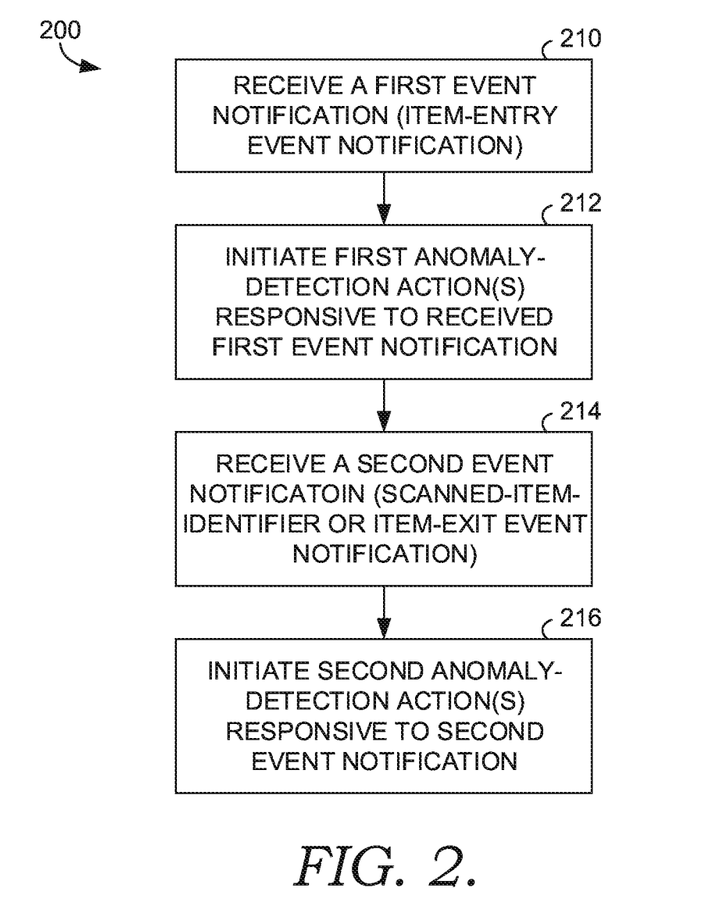
FIG. 2 is a flow diagram illustrating a method for detecting scanning anomalies, in accordance with embodiments of the present disclosure.

Turning now to FIG. 2, a flow diagram is illustrated showing a method 200, performed by a POS host device, for detecting scanning anomalies according to embodiments of the disclosure. As indicated at block 210, a first event notification is received (e.g., by the receiving component 118 of the POS host device 112 of FIG. 1) from a scanning device (e.g., the scanning device 110 of FIG. 1) coupled with the POS host device. The first event notification may be an item-entry event notification. As indicated at block 212, responsive to the received first event notification, one or more first anomaly-detection actions may be initiated (e.g., by the anomaly-detection-action initiating component 120 of the POS host device 112 of FIG. 1). In embodiments, the first anomaly-detection action may be commencement of video recording. As indicated at block 214, a second event notification may be received from the scanning device (e.g., the scanning device 110 of FIG. 1). The second event notification may be one of a scanned-item-identifier event notification or an item-exit event notification. As indicated at block 216, one or more second anomaly detection actions may be initiated (e.g., by the anomaly detection action initiating component 120 of the POS host device 112 of FIG. 1) responsive to the second event notification. In embodiments, by way of example only, the second anomaly-detection action may be transmission of a scanning-device-disable command, generation of a scanning-anomaly notification, storage of a record indicating the scanned-item-identifier event notification was not received, and/or commencement of a fraud analysis.

Figure 3:
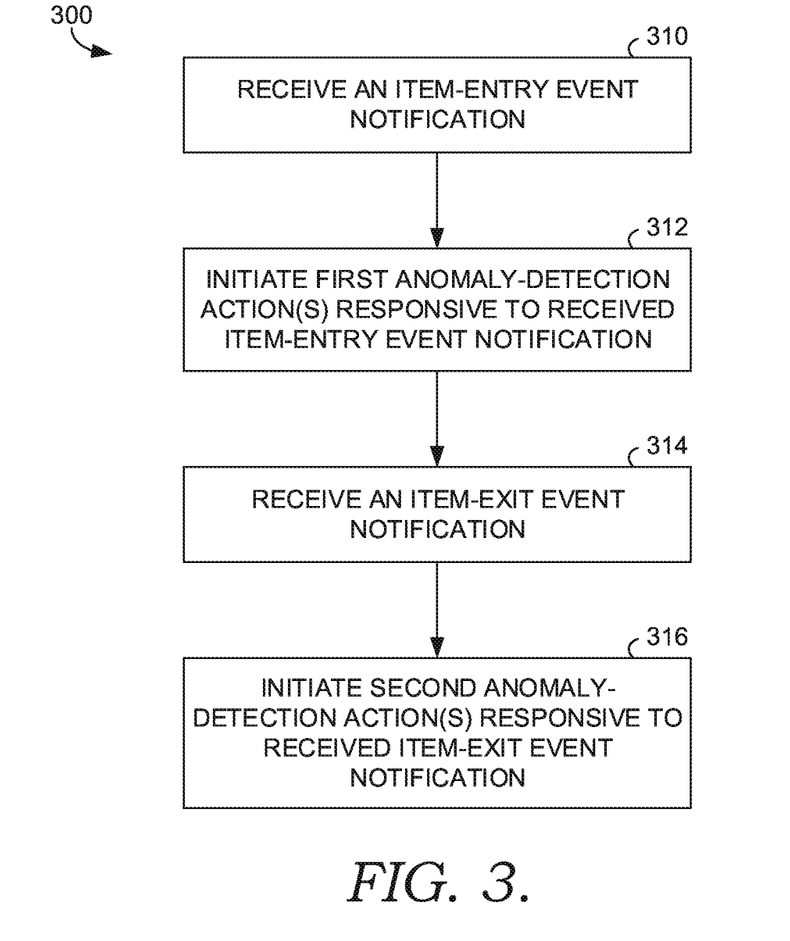
FIG. 3 is a flow diagram illustrating a method for detecting scanning anomalies, in accordance with embodiments of the present disclosure.

Turning now to FIG. 3, a flow diagram is illustrated showing a method 300 for detecting scanning anomalies according to embodiments of the disclosure. As indicated at block 310, an item-entry event notification may be received (e.g., by the receiving component 118 of the POS host device 112 of FIG. 1) from a scanning device (e.g., the scanning device 110 of FIG. 1). As indicated at block 312, one or more first anomaly-detection actions may be initiated (e.g., by the anomaly-detection-action initiating component 120 of the POS host device 112 of FIG. 1) responsive to the received item-entry event notification. In embodiments, the first anomaly-detection action may be commencement of video recording. As indicated at block 314, an item-exit event notification may be received (e.g., by the receiving component 118 of the POS host device 112 of FIG. 1) from the scanning device (e.g., the scanning device 110 of FIG. 1). As indicated at block 316, one or more second anomaly detection actions may be initiated (e.g., by the anomaly-detection-action initiating component 120 of the POS host device 112 of FIG. 1) responsive to the second event notification. In embodiments, by way of example only, the second anomaly-detection action may be transmission of a scanning-device-disable command, generation of a scanning-anomaly notification, storage of a record indicating the scanned-item-identifier event notification was not received, and/or commencement of a fraud analysis.

Figure 4:
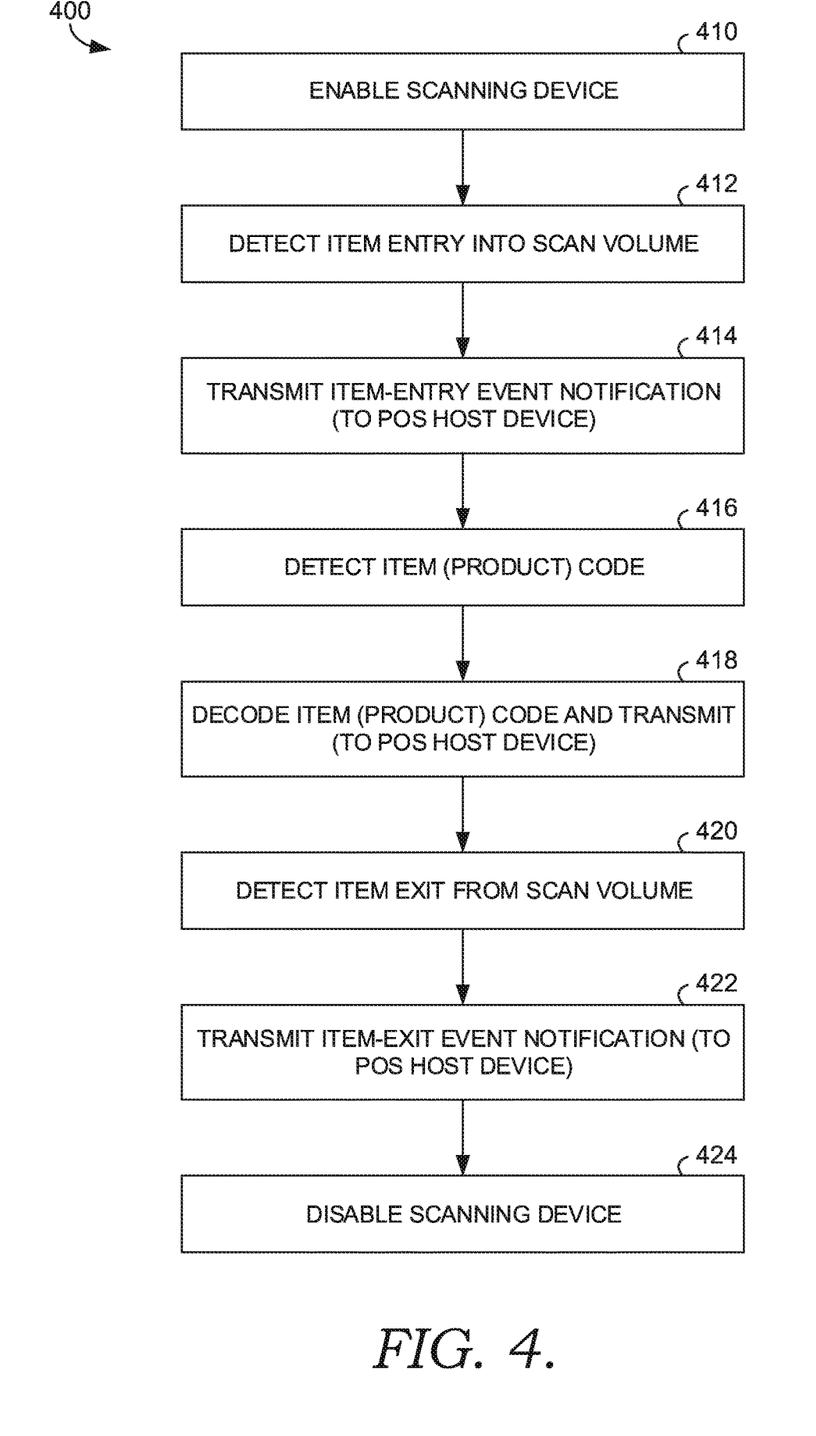
FIG. 4 is a flow diagram illustrating a "read" scanning operation, in accordance with embodiments of the present disclosure.

With reference to FIG. 4, a flow diagram is illustrated showing a "read" scanning operation 400 according to embodiments of the disclosure. As previously described, a "read" scanning operation is a scanning operation in which an item is successfully scanned by a scanning device (e.g., the scanning device 110 of FIG. 1) during the time in which an item is detected to be within the scan volume thereof. As indicated at block 410, the scanning device may be enabled such that the scanning device is capable of detecting and transmitting codes (e.g., product codes and/or activity codes) associated with scanning operations. In embodiments, the scanning device may be enabled responsive to receiving a scanning-device-enable command, for instance, from a POS host device (e.g., the POS host device 112 of FIG. 1).

As indicated at block 412, the scanning device may detect entry of an item into the scan volume thereof. As indicated at block 414, responsive to detecting entry of the item into the scan volume, an item-entry event notification may be transmitted, for instance, to the POS host device. As indicated at block 416, subsequent to detecting entry of the item into the scan volume of the scanning device, the scanning device may detect an item (product) code. Responsive thereto, the scanning device may decode the item (product) code and transmit the same, for instance, to a POS host device, as indicated at block 418. As indicated at block 420, the scanning device, subsequent to detection of the item (product) code, may detect exit of the item from the scan volume. Responsive to detection of the item exiting the scan volume, and as indicated at block 422, an item-exit event notification may be transmitted, for instance, to a POS host device. In embodiments, the item-exit event notification may include a unique code indicative of detecting item exit subsequent to a successful reading of the item (product) code. As indicated at block 424, the scanning device subsequently may be disabled. In embodiments, the scanning device may be disabled responsive to receiving a scanning-device-disable command from a POS host device (e.g., the POS host device 112 of FIG. 1). In embodiments, the scanning device may automatically be disabled responsive to receiving and transmitting an item-exit event notification.

Figure 5:
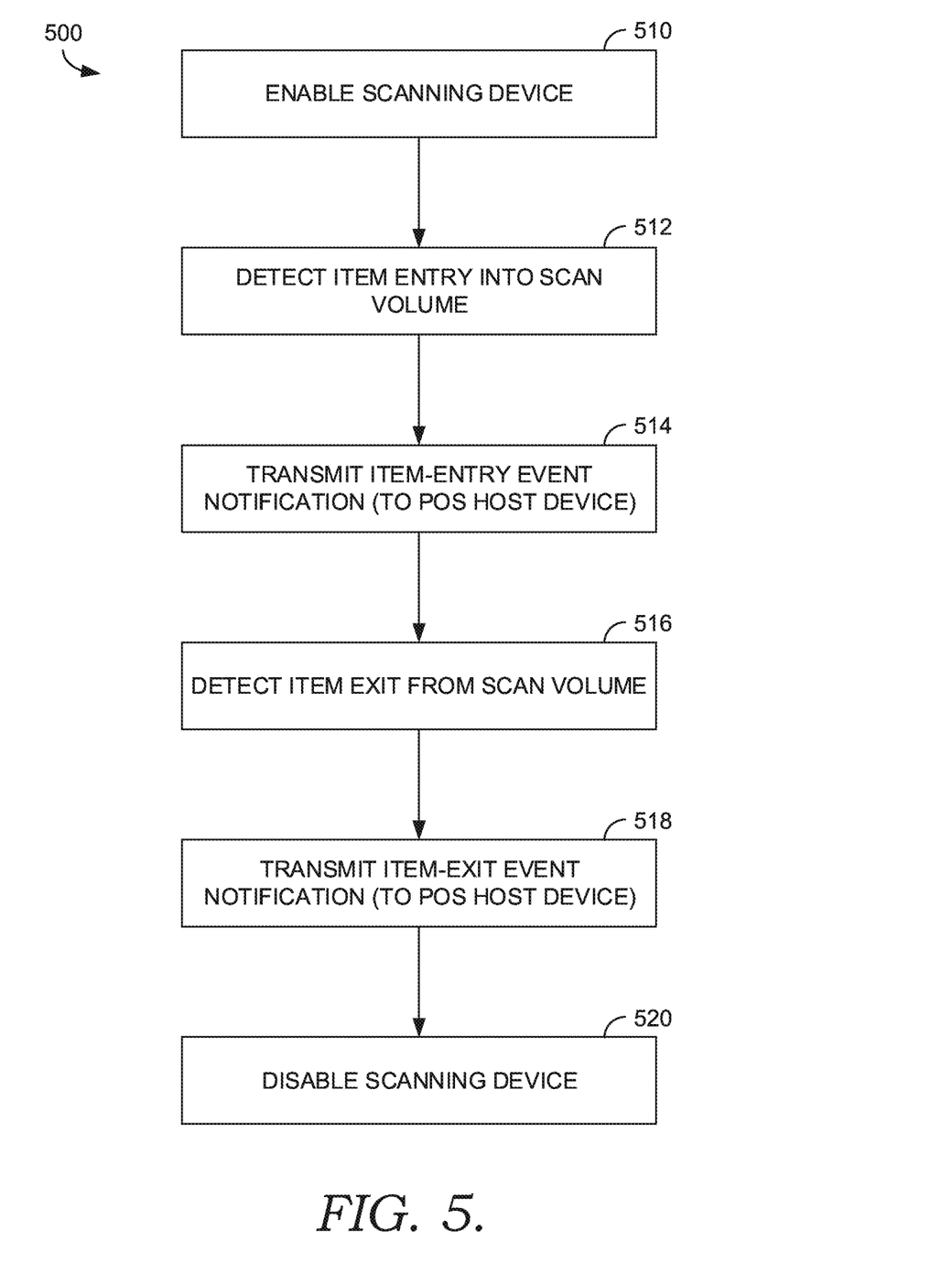
FIG. 5 is flow diagram illustrating a "no read" scanning operation, in accordance with embodiments of the present disclosure.

Turning now to FIG. 5, flow diagram is illustrated showing a "no read" scanning operation according to embodiments of the disclosure. As previously described, a "no read" scanning operation is a scanning operation in which an item is not successfully scanned by a scanning device (e.g., the scanning device 110 of FIG. 1) during the time in which an item is detected to be within the scan volume thereof. As indicated at block 510, the scanning device may be enabled such that the scanning device is capable of detecting and transmitting codes (e.g., product codes and/or activity codes) associated with scanning operations. In embodiments, the scanning device may be enabled responsive to receiving a scanning-device-enable command, for instance, from a POS host device (e.g., the POS host device 112 of FIG. 1).

As indicated at block 512, the scanning device may detect entry of an item into the scan volume thereof. As indicated at block 514, responsive to detecting entry of the item into the scan volume, an item-entry event notification may be transmitted, for instance, to a POS host device. As indicated at block 516, subsequent to detecting entry of the item into the scan volume of the scanning device, the scanning device may detect exit of the item from the scan volume. Responsive to detection of the item exiting the scan volume, and as indicated at block 518, an item-exit event notification may be transmitted, for instance, to a POS host device. In embodiments, the item-exit event notification may include a unique code indicative of detecting item exit without a successful reading of an item (product) code. As indicated at block 520, the scanning device subsequently may be disabled. In embodiments, the scanning device may be disabled responsive to receiving a scanning-device-disable command from a POS host device (e.g., the POS host device 112 of FIG. 1). In embodiments, the scanning device may automatically be disabled responsive to receiving and transmitting an item-exit event notification.

Figure 6:
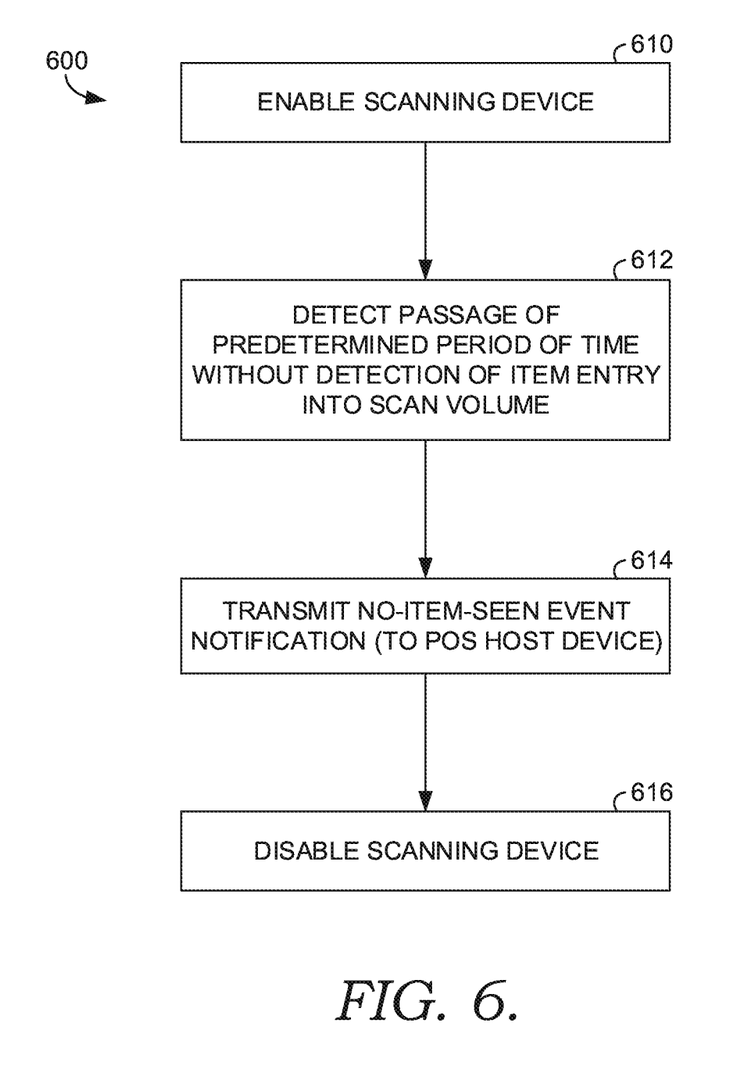
FIG. 6 is a flow diagram illustrating a "no item seen" scanning operation, in accordance with embodiments of the present disclosure.

With reference now to FIG. 6, a flow diagram is illustrated showing a "no item seen" scanning operation 600 according to embodiments of the disclosure. As previously described, a "no item seen" scanning operation is a scanning operation in which an item is not detected as entering the scan volume of a scanning device (e.g., the scanning device 110 of FIG. 1) during a predetermined period of time subsequent to the scanning device being enabled. As indicated at block 610, the scanning device may be enabled such that the scanning device is capable of detecting and transmitting codes (e.g., product codes and/or activity codes) associated with scanning operations. In embodiments, the scanning device may be enabled responsive to receiving a scanning-device-enable command, for instance, from a POS host device (e.g., the POS host device 112 of FIG. 1).

As indicated at block 612, the scanning device detects that a predetermined period of time has passed since enablement without detection of an item entry into the scan volume thereof. Responsive to detection of the passage of the predetermined period of time, and as indicated at block 614, no-item-seen event notification may be transmitted, for instance, to a POS host device that is indicative of the detected event. As indicated at block 616, the scanning device subsequently may be disabled. In embodiments, the scanning device may be disabled responsive to receiving a scanning-device-disable command from a POS host device (e.g., the POS host device 112 of FIG. 1). In embodiments, the scanning device may automatically be disabled responsive to receiving and transmitting a no-item-seen event notification.

As can be understood, embodiments of the present disclosure provide systems and methods for, among other things, detecting anomalies, for instance, user-caused scanning anomalies, which occur during scanning transactions. Scanning-related events may be detected by a scanning device and notifications of such events may be transmitted from the scanning device to a point-of-sale (POS) host device coupled therewith. In aspects, the notifications transmitted to the POS host device include a unique code (e.g., a barcode or label) that is indicative of the corresponding event. Responsive to receipt of the event notifications and the nature thereof, the POS host device may initiate one or more anomaly detection actions.

Aspects hereof have been described in relation to particular embodiments, which are intended in all respects to be illustrative rather than restrictive. Alternative embodiments will become apparent to those of ordinary skill in the art to which aspects of the present invention pertain without departing from its scope.

While aspects hereof are susceptible to various modifications and alternative constructions, certain illustrated embodiments are shown in the drawings and have been described above in detail. It should be understood, however, that the disclosure is not limited aspects hereof or the specific forms disclosed, but on the contrary, the disclosure includes all modifications, alternative constructions, and equivalents falling within the spirit and scope of aspects of the invention as defined by the claims.

What is claimed is:

1. A method performed by a point-of-sale host device, the method for detecting scanning anomalies and comprising:
receiving, from a scanning device, item codes responsive to the scanning device detecting and decoding an optical code on an item within a scan volume of the scanning device;
receiving, from the scanning device, a first event notification in a same code format as the item codes sent by the scanning device, the first event notification being a unique code indicative of an item-entry event notification;
initiating one or more first anomaly-detection actions responsive to the received first event notification;
receiving, from the scanning device, a second event notification after the first event notification and in the same code format as the item codes, the second event notification being a unique code indicative of one of a scanned-item-identifier event notification or an item-exit event notification; and
initiating one or more second anomaly-detection actions responsive to the second event notification.

2. The method of claim 1, further comprising transmitting, to the scanning device, a scanning-device-enable command before receipt of the first event notification.

3. The method of claim 1, wherein the one or more first anomaly detection actions include commencement of video recording.

4. The method of claim 3, wherein receiving the second event notification comprises receiving the scanned-item-identifier event notification, and wherein the one or more second anomaly-detection actions include cessation of video recording.

5. The method of claim 1, wherein receiving the second event notification comprises receiving the scanned-item-identifier event notification, and wherein the one or more second anomaly-detection action includes transmission of a scanning-device-disable command from the point-of-sale host system to the scanning device.

6. The method of claim 5, further comprising receiving a third event notification from the scanning device after the second event notification and in the same code format as the item codes and prior to initiating at least one of the one or more second anomaly-detection actions, the third event notification being a unique code indicative of the item-exit event notification.

7. The method of claim 1, wherein receiving the second event notification comprises receiving the item-exit event notification, and wherein the one or more second anomaly-detection actions include:
   transmission of a scanning-device-disable command,
   generation of a scanning-anomaly notification,
   storage of a record indicating the scanned-item-identifier event notification was not received, and
   commencement of a fraud analysis.

8. A system for detecting scanning anomalies, the system comprising:
   a scanning device; and
   a point-of-sale host device,
   wherein the scanning device is configured to:
      detect and decode an optical code on an item within a field-of-view of the scanning device;
      detect events, including item-entry events, item identifier scan events and item-exit events; and
      transmit notifications of detected events to the point-of-sale host device in a same code format as a code format of an item code decoded by the scanning device that is transmitted to the scanning device, and
   wherein the point-of-sale host device is configured to:
      receive the event notifications from the scanning device, including item-entry event notifications, scanned-item-identifier event notifications and item-exit event notifications, and
      initiate anomaly detection actions responsive to the received event notifications.

9. The system of claim 8, wherein at least one of the item-entry event notification, the scanned-item-identifier event notification and the item-exit event notification comprises a code that is indicative of the corresponding event.

10. The system of claim 8, wherein the point-of-sale host device further is configured to transmit scanning-device-enable commands and scanning-device-disable commands to the scanning device.

11. The system of claim 8, wherein the anomaly-detection actions include one or more of transmission of a scanning-device-enable command, transmission of a scanning-device-disable command, commencement of video recording, cessation of video recording, generation of a scanning-anomaly notification, storage of a record indicating that a scanned-item-identifier event notification was not received, and commencement of a fraud analysis.

12. The system of claim 8, wherein the scanning device includes a camera, and wherein the scanning device is configured to detect an item-entry event responsive to detecting an item has entered a field-of-view of the camera and to detect an item-exit event responsive to detecting the item has exited the field-of-view of the camera.

13. The system of claim 8, wherein the point of sale host device is configured to control operation of the scanning device according to the second anomaly-detection actions based on the second event notification.

14. A method for detecting scanning anomalies, the method comprising:
   capturing image data from a camera of a scanning device;
   detecting entry of an item into a scan volume of the camera responsive to analyzing the image data;
   transmitting an item-entry event notification including a first event code from the scanning device to a point-of-sale (POS) host device;
   transmitting an item code to the POS host device if the item is identified from observable indicia associated with the item while analyzing the image data;
   detecting exit of the item from the scan volume of the camera responsive to analyzing the image data; and
   transmitting an item-exit event notification including a second event code from the scanning device to the POS host device, wherein the item code, the first event code, and the second event code are each unique codes of a same code format.

15. The method of claim 14, wherein transmitting the item-exit event notification is subsequent to transmitting the item-entry event notification and without transmitting any intervening event notifications.

16. The method of claim 14, wherein the second event code is a different code depending on whether or not the item was identified prior to detecting the item exiting the scan volume of the camera of the scanning device.

17. The method of claim 14, further comprising:
   the scanning device entering a wait state in which decoding is disabled; and
   the scanning device exiting the wait state and enabling decoding responsive to receiving an enable command from the POS host device.

18. The method of claim 17, wherein entering the wait state is responsive to detecting exit of the item from the scan volume without first identifying the item from the observable indicia.

* * * * *